United States Patent [19]

Fohl

[11] Patent Number: 5,288,992
[45] Date of Patent: Feb. 22, 1994

[54] WIDE ANGLE, NARROW BAND OPTICAL FILTER

[75] Inventor: Timothy Fohl, Carlisle, Mass.

[73] Assignee: GTE Laboratories Incorporated, Waltham, Mass.

[21] Appl. No.: 991,061

[22] Filed: Dec. 15, 1992

[51] Int. Cl.$^5$ ............................................. H01J 3/14
[52] U.S. Cl. ......................................... 250/216; 385/89; 385/126; 250/227.28; 250/226
[58] Field of Search ............ 250/216, 227.11, 227.28, 250/227.29, 226, 227.2; 385/29, 115, 116, 119, 120, 88-89, 126, 147

[56] References Cited

U.S. PATENT DOCUMENTS

| | | | |
|---|---|---|---|
| 4,184,749 | 1/1980 | Grossman | 250/216 |
| 4,225,782 | 9/1980 | Kuppenheimer, Jr. et al. | 250/216 |
| 4,252,408 | 2/1981 | Parsons et al. | 385/120 |
| 4,547,040 | 10/1985 | Yamamoto et al. | 385/115 |
| 4,554,447 | 11/1985 | Howard et al. | 250/216 |
| 4,818,860 | 4/1989 | Hasegawa | 250/227.28 |
| 4,913,518 | 4/1990 | Fine | 385/115 |
| 4,935,630 | 6/1990 | Merchant | 250/216 |
| 4,991,971 | 2/1991 | Geary et al. | 250/227.29 |
| 5,124,859 | 6/1992 | Martin | 359/886 |
| 5,208,890 | 5/1993 | Kohler et al. | 385/120 |

FOREIGN PATENT DOCUMENTS 2238113  5/1991  United Kingdom ........... 250/227.28

OTHER PUBLICATIONS

Barry et al. High Speed Nondirective Optic Communication for Wireless Networks, IEEE Network Magazine, Nov. 1991, pp. 44–51.

Optical Filters and Coatings, Corion Corporation Oct. 1988.

Loss Mechanisms in Optical Light Pipes Remillard et al. Applied Optics, vol. 31, p. 7232, Dec. 1992.

High Collection Nonimaging Optics, Welford and Winston, Academic Press, 1989, pp. 57–58, 206.

Keene et al. Compact Infrared Heat Trap Optics vol. 17, No. 7, Applied Optics (1978).

Primary Examiner—Michael Messinger
Attorney, Agent, or Firm—Lawrence E. Monks

[57] ABSTRACT

A filtering system is disclosed for receiving and bandpass filtering free space optical signals. The filtering system includes a plurality of optical fibers for accepting an optical signal. The fibers are implanted in an embedding material, having an index of refraction which is less than the optical fiber, for collimating the optical signal. The signal is further passed through a narrow, bandpass filter before detection by a photodetector device. In an alternative embodiment, the optical fibers are enclosed in a cladding, having a surface roughness at the interface of the cladding and the fiber, for enhancing the collimation of the optical signal.

11 Claims, 3 Drawing Sheets

WIDE ANGLE, NARROW BAND OPTICAL FILTER

FIELD OF THE INVENTION

The instant invention relates generally to optical filters and more particularly to apparatus which can be used to build optical systems with very narrow band transmission.

BACKGROUND OF THE INVENTION

Often it is desirable to block light or any other optical band radiation from reaching a detector with the exception of radiation within a specific wavelength band. Narrow band optical systems have been developed for a wide variety of applications for many years. The usual objective is to isolate an optical signal of a specific wavelength in the presence of a large flux of noise, i.e. optical radiation at other wavelengths. A better signal to noise ratio can be derived from the detector if the signal is within a narrow band of the optical spectrum. Noise is caused by background light outside the band of the signal and such filters typically find use in wireless communication applications as described by Barry et al. in "High-Speed Nondirective Optic Communication for Wireless Networks", *IEEE Network Magazine*, November 1991.

In conventional filtering systems, the absorption of light at specific wavelengths is sometimes used as a means of filtering. However such filters are usually not capable of isolating a narrow passband, and they tend to be lossy at the desired band.

In a further approach, filters composed of layers of thin dielectric films consisting of materials with widely differing refractive indices have been utilized. Such filters are known as interference filters and are capable of isolating quite narrow passbands with relatively high transmission at the desired band. Interference filters, however, have the characteristic that the passband shifts as the angle the light ray makes with respect to the surface of the filter varies. This characteristic is a disadvantage in filtered optical systems which require wide angle reception again as described in Barry et al., supra.

A filtering system which provides for wide angle reception is described by Martin and Fohl in U.S. Pat. No. 5,124,859. Although this filter is a clear advance over the prior art, it can only operate at wavelengths for which suitable atomic transitions exist.

It is thus desirable to provide an optical filtering system that has a wide angle of acceptance but maintains the narrow passband of a interference filter normal to a well collimated beam. It is further desirable that such a filtering system be amenable to a simple and compact implementation.

OBJECTS OF THE INVENTION

It is a primary object of the invention to obviate the above noted disadvantages of the prior art.

It is a further object of the invention to provide an optical filtering system which can utilize wide angle optics and still maintain a very narrow pass band.

It is a still further object of the invention to provide an optical filtering system which utilizes an optical fiber to receive the optical signal.

SUMMARY OF THE INVENTION

The above and other objects and advantages are achieved in one aspect of the invention by implanting multiple fibers in an embedding material for reception of free space optical signals preferably in the infrared band of the electromagnetic spectrum. By choosing the indices of refraction for both the fiber and the embedding material appropriately, an angle of reception by the fibers for incident optical signals by the fibers is defined. Received optical signals propagate through the fiber and are input to an interference filter for bandpass filtering of the signals. The filtered signal may be concentrated using a lens or nonimaging concentrator before being presented to a photodetector for converting the optical signal to an electrical signal.

DETAILED DESCRIPTION OF THE INVENTION

Figure 1:
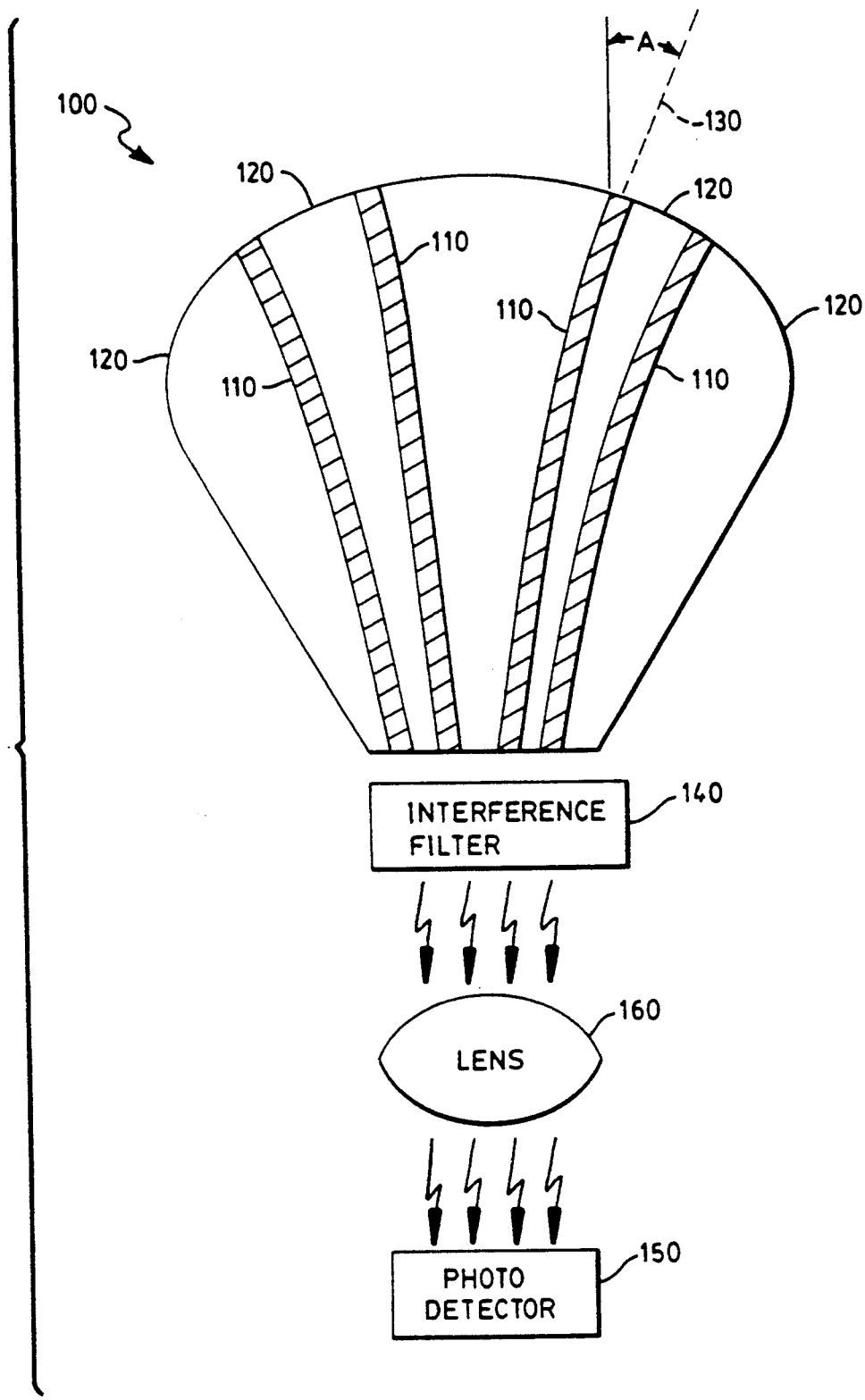
FIG. 1 is a cross sectional view of a filter system utilized in receiving free space optical signals in accordance with the instant invention.
Figure 2:
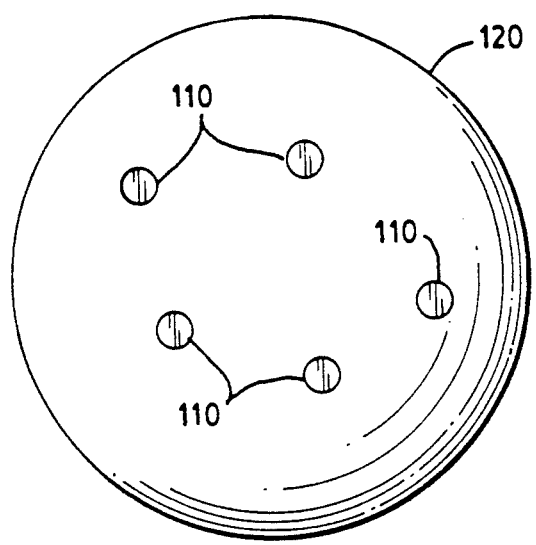
FIG. 2 is a top view of a filter system utilized in receiving free space optical signals in accordance with the instant invention.

One embodiment of the invention is depicted in FIG. 1 which is a cross section of the instant filtering system 100 for receiving free space optical signals, preferably in the infrared band of the electromagnetic spectrum. However, other optical signals for example signals in the the visible and ultraviolet spectrum are within the scope of the invention. In this embodiment radiation both the signal and background noise enters the device through the end of the fibers 110. Only a few fibers 110 are shown in the drawing to simplify the picture, but one of ordinary skill in the art will recognize that more fibers 110 can be added to the device 100 without departing from the spirit of the invention. In FIG. 2 a top view of filter 100 is shown which also depicts fibers 110 and the embedding material 120. Referring again to FIG. 1, the fibers 110 which are highly transmissive, are implanted in a embedding material 120 which is highly absorptive. Optical rays which are within the acceptance angle of the fibers 110 will be transmitted through the fiber 110 and conversely optical rays which are outside the acceptance angle will penetrate the embedding material 120 and be absorbed. The angle A of acceptance by a fiber 110 is approximated as:

$$\sin A = (n_f^2 - n_e^2)^{0.5}$$

where $n_f$ is the index of refraction of the fiber 110 and $n_e$ is the index of refraction of the embedding material 120 with $n_f$ greater than $n_e$ and the difference of the index of refractions being small, between the incident ray and the axis of the fiber 110. The rays which are accepted can be confined to a narrow cone if the two indices of refraction are nearly the same. As an example, if the indices of the fiber 110 and the embedding material 120 are 1.5 and 1.49 respectively, the accepted optical rays will be confined to a cone of approximately 10 degrees half angle.

As is shown in FIG. 1, the fibers 110 are all arranged such that their axes are normal to the surface of interference filter 140, and thus the rays emerging are substantially collimated and confined to a cone of angle A with respect to the normal before passing to photodetector 150. Interference filter 140 is of conventional design, and is known by those skilled in the art.

The behavior of an interference filter 140 as rays enter the filter away from the normal is described in *Optical Filters and Coatings* by Corion Corporation of Hopkington, Ma. (October 1988) and incorporated by reference herein. Consequently, an estimate of the effective band pass of the filtering 100 system can be derived. With a very narrow passband for the interference filter 140, the system passband will be given by the shift in transmission wavelength at the maximum angle of the cone of rays, A. The percentage shift in pass wavelength is given by:

$$\text{Percentage wavelength shift} = \frac{100(n_s^2 - n_f^2 + n_e^2)^{0.5}}{n_s}$$

where $n_s$ is an average value of the index of refraction of the interference filter 140. As an example, with the average index as 2.0 and an acceptance angle of 10 degrees, the shift is approximately 0.4 percent. With the pass band of the filter centered at 800 nm, the pass band of the system is approximately 3.2 nm. Accordingly, a filtering system with an arbitrarily wide viewing angle can be shown to have a passband only a few nanometers wide.

The above achieves the objects of the invention. However, it does this at the cost of reducing the signal as well as the noise. The signal attenuation can be counteracted by increasing the surface area of the ends of the fibers and the detector. In some applications where there are limits on detector area for example because of frequency response requirements or cost, a concentrator 160 can be utilized between the interference filter and the detector. In one embodiment of the invention and as illustrated in FIG. 1, the concentrator 160 is a lens, but more powerful nonimaging concentrators 160 can be used as described in *High Collection Nonimaging Optics* by Welford and Winston. Concentration increases the angle of the rays relative to the optical axis of the system. The product of this angle and the area through which the bundle of rays flow, called the etendue, is constant. However, the detector typically accepts energy over a wide angle with the spread angle emerging from the filter being small in comparison. Thus even in systems where detector area is a limiting factor on signal level, the instant filtering system allows high rejection of background noise without sacrificing much signal.

Figure 3:
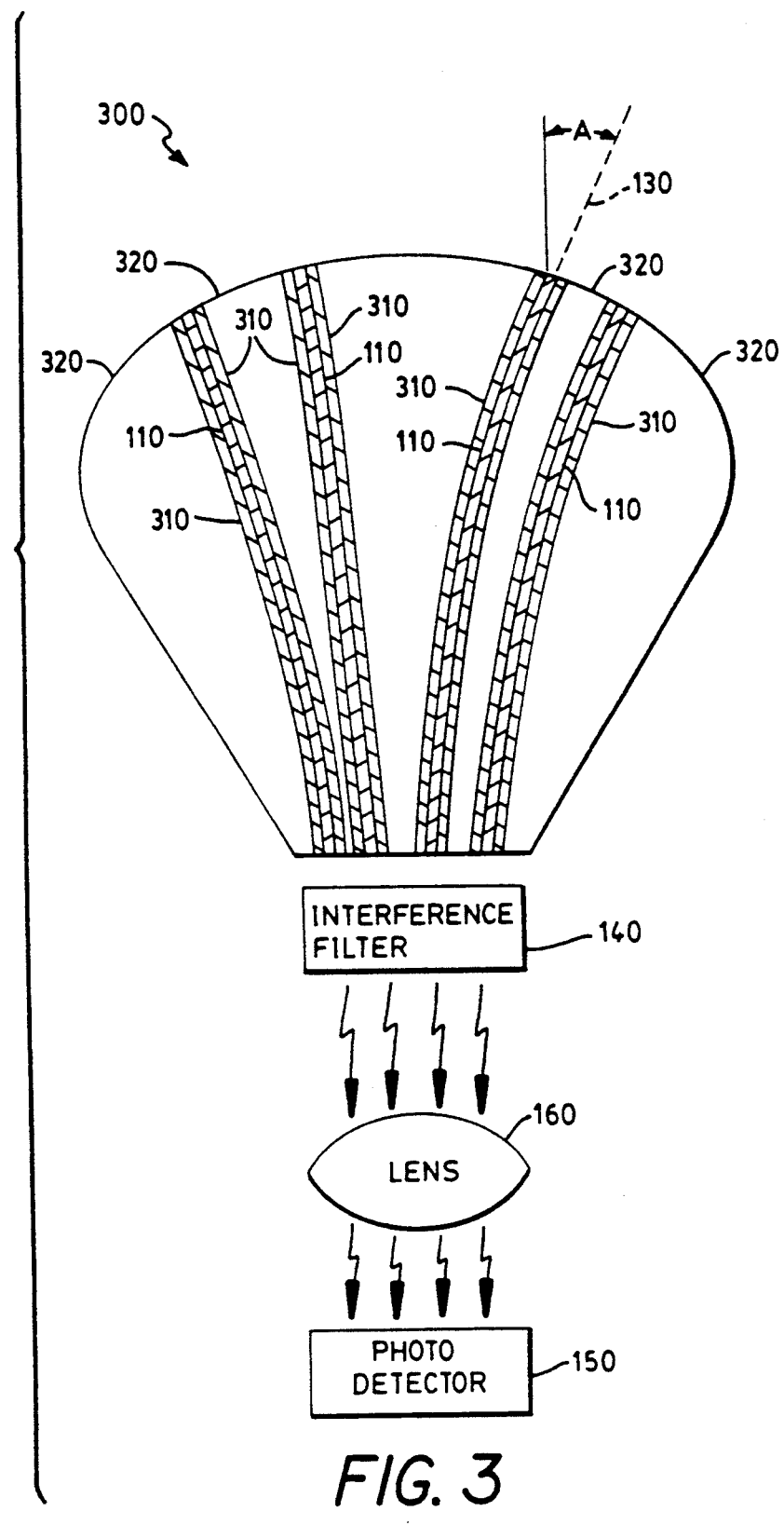
FIG. 3 is a cross sectional view of an alternate embodiment of a filter system utilized in receiving free space optical signals in accordance with the instant invention.

Referring now to FIG. 3 wherein is depicted an alternate embodiment in accordance with the current invention. Fibers 110, enclosed with a cladding 310, are embedded in a supporting material 320. As opposed to the embodiment described above, the embedding material of this embodiment provides solely a support for the fibers 110 and their cladding 310. The cladding 310 for fiber 110 consists of a material which has a surface roughness at the interface of the the cladding and the fiber as described in "Loss Mechanisms in Optical Light Pipes" by Remillard et al., *Applied Optics*. vol. 31, pg. 7232, December 1992, which is included by reference herein. The surface roughness of the cladding 310 enhances the collimating effect of the fiber 110. As was described in the previous embodiment, optical rays which propagate through the fiber 110 are presented to interference filter 140 for bandpass filtering before reception at photodetector 150.

In another embodiment of the invention, cladding 310 is highly absorptive of high angle rays entering fiber 110 which again enhances the collimating effect of fiber 110. As an example, a black cladding is highly absorbing. Additionally, the loss of high angle rays entering the fibers is inversely proportional to the diameter of fiber 110 and can be thus be engineered for a specific application of the filter system.

While there has been shown and described what is at present considered the preferred embodiment of the invention it will be obvious to those skilled in the art that various changes and modifications may be made therein without departing from the invention as defined by the appended claims.

What is claimed is:

1. A filtering system for receiving a free space optical signal separated from background optical noise comprising:
    a plurality of optical fiber means having an index of refraction $n_f$ for receiving said optical signal at an angle A and passing said free space optical signal therethrough;
    an embedding material means, having an index of refraction $n_e$ which is less than $n_f$, formed as a surface with a semi spherical shape which is tapered to a planar surface, with said optical fiber means being curved and embedded therein and having one end of the optical fiber means normal to the spherical surface and the other end of the optical fiber means normal to the planar surface for supporting said optical fiber means;
    a filter means coupled to said embedded material means for rejecting said background optical noise and transmitting said passed optical signal of the optical fiber means;
    a photodetector means for detecting said transmitted optical signal of the filter means.

2. The filtering system of claim 1 wherein sin $A = (n_f^2 - n_e^2)^{0.5}$.

3. The filtering system of claim 1 further including:
    concentration means coupled to said filter means for concentrating said transmitted optical signal.

4. The filtering system of claim 1 wherein said free space optical signal is within the infrared band of the electromagnetic spectrum.

5. The filtering system of claim 1 wherein said free space optical signal is within the visible band of the electromagnetic spectrum.

6. The filtering system of claim 1 wherein said free space optical signal is within the ultraviolet band of the electromagnetic spectrum.

7. The filtering system of claim 1 wherein said passed free space optical signal is substantially collimated.

8. The filtering system of claim 3 wherein the concentration means is a lens.

9. A filtering system for receiving a free space optical signal separated from background optical noise comprising:
    a plurality of optical fiber means for receiving said optical signal and passing said free space optical signal therethrough;
    a plurality of cladding means connected to said optical fiber means for collimating said passed optical signal;
    an embedding material means, formed as a surface with a semi spherical shape which is tapered to a planar surface, with said optical fiber means being curved and embedded therein, and having one end of the optical fiber means normal to the spherical surface and the other end of the optical fiber means normal to the planar surface for supporting said optical fiber means;

a filter means coupled to said embedded material means for rejecting said background optical noise and transmitting said passed optical signal of the optical fiber means;

a photodetector means for detecting said transmitted optical signal of the filter means.

10. The filtering system of claim 9 wherein said cladding means has a rough surface at the connection to the optical fiber means.

11. The filtering system of claim 9 wherein said cladding means is highly absorptive.

* * * * *